United States Patent [19]
Hudson

[11] Patent Number: 5,393,831
[45] Date of Patent: Feb. 28, 1995

[54] SHELF STABLE NONWOVEN FABRICS AND FILMS

[75] Inventor: Robert L. Hudson, Roswell, Ga.

[73] Assignee: Kimberly-Clark Corporation, Neenah, Wis.

[21] Appl. No.: 57,721

[22] Filed: May 5, 1993

[51] Int. Cl.$^6$ ............................ C08K 5/09; C08K 5/16
[52] U.S. Cl. ........................................ 525/55; 428/224; 428/913; 523/126; 525/193; 525/195; 525/245; 525/326.1; 525/370; 525/383
[58] Field of Search ................. 523/126; 525/55, 193, 525/195, 245, 326.1, 370, 383; 428/224, 913

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | . |
| 3,502,538 | 3/1970 | Petersen | . |
| 3,502,763 | 3/1970 | Hartmann | 264/210 |
| 3,542,615 | 11/1970 | Dobo et al. | 156/181 |
| 3,676,242 | 7/1972 | Prentice | 156/62.4 |
| 3,692,618 | 9/1972 | Dorschner et al. | . |
| 3,825,380 | 7/1974 | Harding et al. | 425/72 |
| 3,849,241 | 11/1974 | Butin et al. | . |
| 3,909,009 | 9/1975 | Cvetko et al. | 274/37 |
| 3,981,650 | 9/1976 | Page | 425/72 |
| 4,100,324 | 7/1978 | Anderson et al. | 428/288 |
| 4,340,563 | 7/1982 | Appel et al. | 264/518 |
| 4,405,297 | 9/1983 | Appel et al. | 425/72 |
| 4,983,651 | 1/1991 | Griffin | 524/47 |

FOREIGN PATENT DOCUMENTS 803714 1/1969 Canada .
88/09354 12/1988 WIPO .

OTHER PUBLICATIONS

Naval Research Laboratory Report No. 4364, "Manufacture of Superfine Organic Fibers" by V. A. Wente, E. L. Bone, and C. D. Fluharty, pp. 1–19, published May 24, 1954 in Washington, D.C.

Naval Research Laboratory Report No. 5265, "An Improved Device for the Formation of Superfine, Thermoplastic Fibers" by K. D. Lawrence, R. T. Lukas and J. A. Young, pp. 1–12, published Jan. 11, 1958 in Washington, D.C.

American Chemical Society article on "A Study of the Oxidative Degradation of Polyolefins" by Alan J. Sipinen and Denise R. Rutherford, pp. 185–187, published 1992.

American Chemical Society article on "The Effect of Transition Metal Compounds on the Thermal Oxidative Degradation of Polypropylene in Solution" by Zenjiro Osawa and Takashi Saito, pp. 159–174, published 1978.

*Primary Examiner*—James C. Cannon
*Attorney, Agent, or Firm*—James B. Robinson; William D. Herrick

[57] ABSTRACT

Shelf stable nonwoven fabrics and films are made from polyolefin compositions which comprise a polyolefin which contains no more than a minor amount of a phenolic antioxidant, a water-sensitive stabilizer, a transition metal organic salt and an oxidizable unsaturated compound.

19 Claims, No Drawings

SHELF STABLE NONWOVEN FABRICS AND FILMS

TECHNICAL FIELD

This invention relates to shelf stable nonwoven fabrics and films. In one of its more specific aspects, this invention relates to shelf stable nonwoven fabrics and films made from certain polyolefin compositions.

BACKGROUND OF THE INVENTION

Environmental concerns are of increasing importance today, and many consumer groups are focusing their efforts on the disposability and degradability of various articles. The general public is being urged to use articles which can be made from materials which can be recycled or which will degrade upon exposure to heat and/or humid conditions.

Among the articles which receive substantial attention by environmentally-active consumer groups are packaging articles, such as bags and other containers, and personal care articles, such as towels, washcloths, bathmats, wipes, sanitary napkins and diapers. These articles typically are made from or contain nonwoven fabric or film components which are made from polyolefin compositions (i.e., plastic materials). While these nonwoven fabrics and films (also referred to in this application as "nonwoven components") provide the physical properties which contribute to the desirability and effectiveness of these articles, such nonwoven components generally have the disadvantage of being resistant to the chemical and physical conditions to which they are subjected in a disposal system, such as a municipal composting operation, after the articles are used and discarded.

Therefore, much effort has been directed toward the development of nonwoven fabrics and films which can be used in the manufacture of various articles having the characteristics and advantages desired by consumers, but which will degrade upon exposure to the conditions of temperature and humidity commonly encountered in municipal compost operations.

However, the development of such nonwoven fabrics and films is not an easy task. In the first instance, these nonwoven components must remain stable throughout the manufacture, shipment, storage and use procedures which are encountered in the normal cycle of articles made from such components. In the next instance, these nonwoven components must then degrade within a certain time upon disposal and exposure to the conditions of temperature and high humidity in a municipal compost operation.

The degradation of these nonwoven fabrics and films in a municipal compost operation would clearly benefit the environment by decreasing the volume of garbage going into a landfill.

The prior art has attempted to address the above-described environmental needs by providing degradable plastics. For example, U.S. Pat. No. 4,983,651 describes certain biodegradable synthetic polymer compositions comprising a blend of a stable polymer, an antioxidant, starch, a styrene-butadiene copolymer and a transition metal organic salt.

However, the prior art has not fully met the need for nonwoven fabrics and films which can be used to produce shelf stable articles having a useful life span, but which degrade in a municipal compost operation. Therefore, a need exists for such nonwoven components.

SUMMARY OF THE INVENTION

Briefly described, the present invention provides shelf stable nonwoven fabrics and films. In accordance with this invention, such nonwoven fabrics and films can be used in various articles such as bags and other packaging containers, diapers, wipes, sanitary napkins, washcloths, towels and bathmats.

The shelf stable nonwoven fabrics and films of this invention are, in general terms, made from polyolefin compositions which comprise a mixture of a polyolefin, a water-sensitive stabilizer, a transition metal organic salt and an oxidizable unsaturated compound.

Articles made from or which contain the nonwoven fabrics and films of this invention have a useful shelf life (the period of time from manufacture through consumer use). After disposal, such nonwoven components will degrade upon exposure to the conditions of a compost-type operation.

Accordingly, an object of this invention is to provide shelf stable nonwoven fabrics and films.

Another object of this invention is to provide shelf stable nonwoven fabrics and films which can be used in the manufacture of various articles such as bags and other packaging containers, diapers, wipes, sanitary napkins, washcloths, towels and bathmats.

Another object of this invention is to provide polyolefin compositions which can be used to form shelf stable nonwoven fabrics and films useful in the manufacture of various articles such as bags and other packaging containers, diapers, wipes, sanitary napkins, washcloths, towels and bathmats.

A further object of this invention is to provide articles which have a useful shelf life and which are made from shelf stable nonwoven fabrics and films which, after use and disposal of such articles, degrade upon exposure to certain conditions of temperature and high humidity.

These and other objects, features and advantages of this invention will become apparent from the following detailed description.

DETAILED DESCRIPTION OF THE INVENTION

In accordance with the present invention, shelf stable nonwoven fabrics and films are made from polyolefin compositions formed by mixing a polyolefin, a water-sensitive stabilizer, a transition metal organic salt and an oxidizable unsaturated compound. In a preferred embodiment of this invention, a hydroperoxide is added to the polyolefin composition. In another preferred embodiment of this invention, the polyolefin is either free of any antioxidant or the antioxidant, if present, is a non-phenolic material.

For purposes of this invention, the term "shelf stable" refers to nonwoven fabrics and films which have sufficient stability to survive for at least 30 days the conditions of temperature, humidity, time, etc., commonly encountered during manufacture, shipment, storage and use, but which will degrade within about 5 days (about 120 hours) at 55° C. A temperature of 55° C. is selected as a standard because that temperature is normally reached in a compost operation for a period of 5 days. The initial stability (or shelf life) is also determined at 55° C., as this temperature represents the normal probable upper limit of temperatures which are encountered during manufacture, shipment, storage and use. Therefore, the nonwoven fabrics and films of this invention are stable for at least 30 days (720 hours) at 55° C. under conditions of normal humidity but degrade within about 5 days (about 120 hours) at 55° C. under conditions of high humidity.

The polyolefin compositions which are useful in this invention are the compositions which contain a polyolefin frequently used to manufacture packaging and various consumer articles. The preferred polyolefins are polyethylene, polypropylene, polybutylene, linear low density polyethylene, low density polyethylene, high density polyethylene and mixtures thereof.

From the prior art, the thermal degradation of polyolefins is known to be accelerated by the presence of transition metal compounds (such as manganese stearate). However, the commercially-available polyolefins commonly contain an antioxidant (i.e., stabilizer) which provides stability to the polyolefin after manufacture and during subsequent extrusion, molding and other procedures in the industry. The performance of the transition metal compounds is substantially reduced by the presence of phenolic antioxidants, although a minor amount of such antioxidants can be tolerated (e.g., no more than about 100 ppm). Therefore, this invention preferably employs a polyolefin containing no antioxidants and, in any event, a polyolefin preferably containing no phenolic antioxidants.

An essential feature of this invention is the use of a water-sensitive stabilizer for the polyolefin compositions. Many known stabilizers (such as phenolics and hydroxybenzoates) do not function effectively in this invention because they either do not provide adequate initial stability or do not provide adequate storage stability (high dry oven life) or the desired degradability (low humid oven life).

The preferred stabilizers are hindered amine light compounds and hindered amino-ether compounds which (a) do not contain phenolic groups, (b) have a low molecular weight, i.e., below about 1500, and (c) do not have high melting points (i.e., do not have melting points above the extrusion temperature of the polyolefin). Though not preferred, hindered amine light compounds and hindered amino-ether compounds having either a molecular weight above about 1500 or a melting point above the extrusion temperature of the polyolefin can be used in the polyolefin composition, but the shelf stability of the nonwoven fabrics and films of this invention may be adversely affected.

Examples of preferred hindered amine light compounds are those sold under the trade designation Tinuvin 440 and Tinuvin 770 by Ciba Geigy Corporation. Examples of preferred hindered amino-ether compounds are those sold under the trade designations Tinuvin 123 and CGL-6327 by Ciba Geigy Corporation.

In the above examples of preferred stabilizers, Tinuvin 123 is the isooctyl diether of Tinuvin 770, and CGL-6327 is the cyclohexyl diether of Tinuvin 770.

The stabilizers useful in this invention are water-sensitive (i.e., hydrolyzable) and, therefore, lose their stabilizing properties upon exposure to water, such as would be encountered in the high humidity conditions of a compost operation.

Another essential feature of this invention is the use of a transition metal organic salt to catalyze the degradation of the polyolefin. Although many transition metals can be effectively used in this invention, the preferred metal ions are cobalt, chromium and iron. Examples of other suitable transition metals are cerium, zinc, copper, silver, nickel, manganese and vanadium. Salts of such transition metals include the stearates, oleates, behenates, myristates, erucates, linoleates, naphthenates and complexes such as the acetylacetonates.

The transition metal organic salts used in this invention are preferably formed by combining the transition metals with an organic acid of sufficiently high molecular weight to give salts soluble in the polyolefin composition.

In the polyolefin compositions of this invention, the water-sensitive stabilizer is present in the range of from about 50 ppm to about 1000 ppm by weight, based on the weight of the polyolefin composition. The transition metal organic salt is present in an amount which will provide a metal content of from about 50 ppm to about 1000 ppm by weight, based on the weight of the polyolefin composition.

Another essential feature of this invention is the use of an oxidizable unsaturated compound to promote a high, dry to humid, oven life ratio. This compound may be selected from natural rubbers, styrene butadiene resins, fats, oils, etc. The preferred oxidizable unsaturated compound is a styrene butadiene resin. This compound may be present in an amount within the range of from about 0.5 to about 5.0 percent by weight, based on the weight of the polyolefin composition. The addition of this compound tends to increase the dry oven life more than the humid oven life, which results in a better dry/humid oven life ratio.

This invention also provides for the shelf stable polyolefin compositions optionally to include a melt-extrudable hydroperoxide, such as that sold under the trade designation Luperox 2,5-2,5 by Atochem Company. The inclusion of a hydroperoxide provides an improved dry/humid oven life ratio. The hydroperoxide may be used in amounts ranging from about 0.01 to about 1.0 percent by weight, based on the weight of the polyolefin composition.

In general terms, the water-sensitive stabilizer is believed to impart high stability to the polyolefin composition under the dry conditions of storage, shipping and consumer use. However, upon exposure to the high humidity conditions of a composting operation, the stabilizer will interact with water and lose stabilizing activity. This loss will then allow the transition metal organic salt to catalyze the degradation of the polyolefin.

For purposes of this invention, the term "degradable" refers to the fact that the nonwoven fabric or film, after being subjected to the humid oven test at 55° C. for no more than about 5 days, cannot be removed from the oven without fragmentation.

Shelf stable nonwoven fabrics and films can be formed from the polyolefin compositions described above. These nonwoven fabrics and films are useful as components of various well-known articles, such as bags and other packaging articles, diapers, wipes, sanitary napkins, washcloths, towels and bathmats. The formation of nonwoven fabrics and films is conventional in the industry and need not be detailed in this application.

The nonwoven fabrics and films may be formed using either spunbond or meltblown fibers or a combination thereof. The formation of spunbond material is conventional in the art, and the design and operation of a spunbond forming station is thought to be well within the ability of those having ordinary skill in the art. The nonwoven spunbond webs are prepared in conventional fashion such as illustrated by the following patents: Dorschner et al. U.S. Pat. No. 3,692,618; Kinney U.S. Pat. Nos. 3,338,992 and 3,341,394; Levy U.S. Pat. No. 3,502,538; Hartmann U.S. Pat. Nos. 3,502,763 and 3,909,009; Dobo et al. U.S. Pat. No. 3,542,615; Harmon Canadian Patent No. 803,714; and Appel et al. U.S. Pat. No. 4,340,563. Other methods for forming a nonwoven web having continuous filaments of a polymer are contemplated for use with the present invention.

Spunbond materials prepared with continuous filaments generally have at least three common features. First, the polymer is continuously extruded through a spinneret to form discrete filaments. Thereafter, the filaments are drawn either mechanically or pneumatically without breaking in order to molecularly orient the polymer filaments and achieve tenacity. Lastly, the continuous filaments are subsequently deposited in a substantially random manner onto a carrier belt and bonded to form a web.

Forming nonwoven webs of thermoplastic fibers by meltblowing is well known in the art and described in various patents and publications, including *Naval Research Laboratory Report No.* 4364, "Manufacture of Super-fine Organic Fibers" by V. A. Wendt, E. L. Boon, and C. D. Fluharty; *Naval Research Laboratory Report No.* 5265, "An Improved Device for the Formation of Super-fine Thermoplastic Fibers" by K. D. Lawrence, R. T. Lukas, and J. A. Young; U.S. Pat. Nos. 3,849,241 to Buntin et al.; 3,676,242 to Prentice; and 3,981,650 to Page. In general, meltblowing employs an extruder to force a hot melt of thermoplastic material through a row of fine orifices in a die tip of a die head into converging high velocity streams of heated gas, usually air, arranged on each side of the extrusion orifice. A conventional die head is disclosed in U.S. Pat. No. 3,825,380 to Harding et al. As the hot melt exits the orifices, the hot melt encounters the high velocity heated gas stream, and the stream of thermoplastic material is attenuated by the gas and broken into discrete fibers which are then deposited on a moving collector surface, usually a foraminous belt, to form a web of thermoplastic fibers. The meltblown web can then either be wound into a roll for later use, or the meltblown layer can be formed directly on spunbond web in forming a spunbond/meltblown/spunbond fabric laminate.

The shelf stable nonwoven fabrics and films of this invention can also be used in the production of a coform layer which can then be used as a component of the packaging and articles described above. The production of a co-form layer is in accordance with the disclosure in Anderson et al. U.S. Pat. No. 4,100,324. The co-form layer may include combinations of natural and man-made fibers. The meltblown fibers of the co-form layer may be made from polypropylene, polyethylene and the like. Generally, polypropylene is preferred. The staple length fibers of the co-form layer may be cellulose, cotton, flax, jute, silk, polypropylene, polyethylene or rayon. Because of its cost, cellulose is preferred for the staple length fibers. Particularly, the co-form layer is preferably a 70/30 mixture of wood pulp to polymer fibers.

With regard to the nonwoven fabrics and films and other articles which can be made using the polyolefin compositions of this invention, other materials can be added as desired to achieve various effects. Examples of such other materials include dyes and pigments. If used, these materials are used in the amounts conventional in the industry.

The present invention is further illustrated by the following examples which are illustrative of certain embodiments designed to teach those of ordinary skill in this art how to practice this invention and to represent the best mode contemplated for carrying out this invention.

In the following examples, the oven life tests are conducted by placing samples in an oven at the indicated temperature and under either dry (i.e., normal humidity) or humid (i.e., high humidity) conditions as shown. The "dry" conditions are intended to simulate the conditions to which the samples would be exposed during shipment and storage (also referred to as "shelf stability"). The conditions designated as "humid" are intended to represent the high humidity conditions to which the samples would be exposed in a municipal compost operation.

In preparing the samples, the polyolefin compositions are first prepared by conventional methods, using the components shown in the examples. Next, nonwoven fabric samples are formed by methods well known in the art.

Also in the following examples, the amounts shown for the metal salt, peroxide, styrene butadiene resin (SBR) and stabilizer are stated in percentages by weight, based on the weight of the polyolefin composition.

EXAMPLES 1-2

These examples are prepared from identical polyolefin compositions, except that Example 2 contains 2.0 percent by weight of a styrene butadiene resin. The transition metal organic salt is cobalt stearate, and the stabilizer is Tinuvin 123 (a hindered amino-ether compound).

The results are shown in Table 1.

TABLE 1

| Example | Base Resin | Metal Salt | Stabilizer | SBR | Oven Life in Hrs. @ 55° C. Dry | Oven Life in Hrs. @ 55° C. Humid |
|---|---|---|---|---|---|---|
| 1 | Exxon PLTD 713 | 0.42 | 0.025 | 0 | 312 | 104 |
| 2 | Exxon PLTD 713 | 0.42 | 0.025 | 2.0 | >1920 | 136 |

EXAMPLES 3-7

In these examples, the polymer compositions are shown in Table 2. Each sample contains Exxon PLTD 713 unstabilized polypropylene resin, 1.0 percent by weight of a styrene butadiene resin and 0.21 percent by weight of cobalt stearate as the transition metal organic salt. In addition, Examples 4-7 contain the indicated amounts of a melt-extrudable hydroperoxide sold as Luperox 2,5-2,5. The stabilizer is Tinuvin 123 in Examples 3-5, CGL-6327 in Example 6 and, in Example 7, is a hindered amine light stabilizer sold as Cyasorb UV-3581 by American Cyanamid.

The results are shown in Table 2.

TABLE 2

| Example | Base Resin | Metal Salt | Stabilizer | Peroxide | SBR | Oven Life in Hrs. @ 55° C. Dry | Oven Life in Hrs. @ 55° C. Humid |
|---|---|---|---|---|---|---|---|
| 3 | Exxon PLTD 713 | 0.21 | 0.0125 | 0 | 1.0 | 384 | 84 |
| 4 | Exxon PLTD 713 | 0.21 | 0.0125 | 0.1 | 1.0 | 492 | 49 |
| 5 | Exxon PLTD 713 | 0.21 | 0.0375 | 0.05 | 1.0 | >3116 | 136 |
| 6 | Exxon PLTD 713 | 0.21 | 0.0125 | 0.05 | 1.0 | 1440 | 59 |
| 7 | Exxon PLTD 713 | 0.21 | 0.0125 | 0.05 | 1.0 | 1848 | 62 |

EXAMPLES 8–32

These examples show the manufacture of polymer compositions from Exxon PLTD 713 polypropylene resin (unstabilized) and the amounts indicated in Table 3 of cobalt stearate as the transition metal organic salt, a styrene butadiene resin and Luperox 2,5-2,5 as the hydroperoxide material. In addition, the indicated amounts of the following stabilizers are present. The abbreviation "HALS" refers to a hindered amine light stabilizer.

| Example(s) | Stabilizer | Description | Source |
|---|---|---|---|
| 8 | Tinuvin 123 | hindered amino-ether | Ciba-Geigy |
| 9 | Tinuvin 440 | HALS | Ciba-Geigy |
| 11 | Uvinol 4049 | high melting HALS | BASF |
| 12 | Cyasorb LJV-2908 | hydroxy benzoate (phenolic) | American Cyanamid |
| 13 | Hostanox 03 | phenolic glycol ester | American Hoechat |
| 14 | Irganox 1076 | phenolic propanoate | Ciba-Geigy |
| 15 | Cyasorb UV-3581 | HALS | American Cyanamid |
| 16 | Uvasil 299 | oligomeric HALS* | Eni-Chem |
| 17 | Goodrite 3150 | HALS | B. F. Goodrich |
| 18 | Cyasorb UV-3668 | HALS | American Cyanamid |
| 19 | Cyasorb UV-3604 | HALS | American Cyanamid |
| 20 | Hostavin N20 | high melting HALS | American Hoechat |
| 21 | Chimassorb 944 | oligomeric HALS* | Ciba-Geigy |
| 22 | Tinuvin 770 | HALS (low mol. wt.) | Ciba-Geigy |
| 23 | Tinuvin 765 | HALS (low mol. wt.) | Ciba-Geigy |
| 24 | Cyasorb UV-3346 | oligomeric HALS* | American Cyanamid |
| 25 | Cyasorb UV-1164 | benzotriazole | American Cyanamid |
| 26 | CGL-6327 | hindered amino-ether | Ciba-Geigy |
| 27 | Hostavin N30 | oligomeric HALS* | American Hoechat |
| 28 | Goodrite 3034 | HALS | B. F. Goodrich |
| 29 | Goodrite 7080 | phenolic HALS | B. F. Goodrich |
| 30 | Chimassorb 119FL | high mol. wt. monomeric HALS | Ciba-Geigy |
| 31 | Tinuvin 622 | oligomeric HALS* | Ciba-Geigy |
| 32 | Goodrite 145 | phenolic HALS | B. F. Goodrich |

*mol. wt. is above 1500

The results are shown in Table 3.

TABLE 3

| Example | Base Resin | Metal Salt | Stabilizer | Peroxide | SBR | Oven Life in Hrs. @ 55° C. Dry | Oven Life in Hrs. @ 55° C. Humid |
|---|---|---|---|---|---|---|---|
| 8 | Exxon PLTD 713 | 0.21 | 0.0125 | 0.05 | 1.0 | 2088 | 84 |
| 9 | Exxon PLTD 713 | 0.21 | 0.0125 | 0.05 | 1.0 | 854 | 59 |
| 10 | Exxon PLTD 713 | 0.21 | 0 | 0.05 | 1.0 | 84 | 48 |
| 11 | Exxon PLTD 713 | 0.21 | 0.0125 | 0.05 | 1.0 | 156 | 44 |
| 12 | Exxon PLTD 713 | 0.21 | 0.015 | 0.05 | 1.0 | 88 | 44 |
| 13 | Exxon PLTD 713 | 0.21 | 0.01 | 0.05 | 1.0 | 91 | 44 |
| 14 | Exxon PLTD 713 | 0.21 | 0.01 | 0.05 | 1.0 | 84 | 56 |
| 15 | Exxon PLTD 713 | 0.21 | 0.0125 | 0.05 | 1.0 | 3024 | 84 |
| 16 | Exxon PLTD 713 | 0.21 | 0.0125 | 0.05 | 1.0 | 204 | 59 |
| 17 | Exxon PLTD 713 | 0.21 | 0.0125 | 0.05 | 1.0 | 1620 | 91 |
| 18 | Exxon PLTD 713 | 0.21 | 0.0125 | 0.05 | 1.0 | >3024 | 72 |
| 19 | Exxon | 0.21 | 0.0125 | 0.05 | 1.0 | 1620 | 84 |

TABLE 3-continued

| Example | Base Resin | Metal Salt | Stabilizer | Peroxide | SBR | Oven Life in Hrs. @ 55° C. Dry | Oven Life in Hrs. @ 55° C. Humid |
|---|---|---|---|---|---|---|---|
| 20 | Exxon PLTD 713 | 0.21 | 0.0125 | 0.05 | 1.0 | 444 | 84 |
| 21 | Exxon PLTD 713 | 0.21 | 0.0125 | 0.05 | 1.0 | 84 | 68 |
| 22 | Exxon PLTD 713 | 0.21 | 0.0125 | 0.05 | 1.0 | 408 | 80 |
| 23 | Exxon PLTD 713 | 0.21 | 0.0125 | 0.05 | 1.0 | 780 | 80 |
| 24 | Exxon PLTD 713 | 0.21 | 0.0125 | 0.05 | 1.0 | 64 | 40 |
| 25 | Exxon PLTD 713 | 0.21 | 0.0125 | 0.05 | 1.0 | 64 | 40 |
| 26 | Exxon PLTD 713 | 0.21 | 0.0125 | 0.05 | 1.0 | 2352 | 84 |
| 27 | Exxon PLTD 713 | 0.21 | 0.0125 | 0.05 | 1.0 | 108 | 56 |
| 28 | Exxon PLTD 713 | 0.21 | 0.0125 | 0.05 | 1.0 | 882 | 70 |
| 29 | Exxon PLTD 713 | 0.21 | 0.0125 | 0.05 | 1.0 | 84 | 70 |
| 30 | Exxon PLTD 713 | 0.21 | 0.0125 | 0.05 | 1.0 | 72 | 56 |
| 31 | Exxon PLTD 713 | 0.21 | 0.0125 | 0.05 | 1.0 | 77 | 56 |
| 32 | Exxon PLTD 713 | 0.21 | 0.0125 | 0.05 | 1.0 | 160 | 77 |

This invention has been described in detail with particular reference to certain embodiments, but variations and modifications can be made without departing from the spirit and scope of the invention as defined in the following claims.

What is claimed is:

1. A shelf stable nonwoven fabric or film formed from a polyolefin composition comprising a mixture of:
   A. a polyolefin which contains no more than a minor amount of phenolic antioxidant;
   B. a water-sensitive compound which imparts high stability to the polyolefin composition under dry conditions of storage, shipping and consumer use but which, upon exposure to conditions of high humidity, interacts with water to form a material providing less stability to the polyolefin, allowing a transition metal organic salt to catalyze the degradation of the polyolefin;
   C. a transition metal organic salt; and
   D. an oxidizable unsaturated compound.

2. A shelf stable nonwoven fabric or film as defined by claim 1 wherein the polyolefin is polyethylene, polypropylene or polybutylene.

3. A shelf stable nonwoven fabric or film as defined by claim 2 wherein the polyolefin is polypropylene.

4. A shelf stable nonwoven fabric or film as defined by claim 1 wherein the water-sensitive compound is a hindered amine light stabilizer.

5. A shelf stable nonwoven fabric or film as defined by claim 1 wherein the water-sensitive compound is a hindered amino-ether.

6. A shelf stable nonwoven fabric or film as defined by claim 1 wherein the transition metal is cobalt, chromium or iron.

7. A shelf stable nonwoven fabric or film as defined by claim 1 wherein the transition metal is cobalt.

8. A shelf stable nonwoven fabric or film as defined by claim 1 wherein the transition metal organic salt is a stearate, oleate, behenate, myristate, linoleate or naphthenate.

9. A shelf stable nonwoven fabric or film as defined by claim 8 wherein the transition metal organic salt is cobalt stearate.

10. A shelf stable nonwoven fabric or film as defined by claim 1 wherein the oxidizable unsaturated compound is selected from natural rubbers, styrene butadiene resins, fats and oils.

11. A shelf stable nonwoven fabric or film as defined by claim 10 wherein the oxidizable unsaturated compound is a styrene butadiene resin.

12. A shelf stable nonwoven fabric or film as defined by claim 1 wherein the composition does not degrade for at least 30 days at 55° C. under normal humidity conditions.

13. A shelf stable nonwoven fabric or film as defined by claim 1 wherein the composition degrades within about 120 hours at 55° C. under high humidity conditions.

14. A shelf stable nonwoven fabric or film as defined by claim 1 wherein the water-sensitive stabilizer is present in an amount of from about 50 ppm to about 1000 ppm by weight, based on the weight of the polyolefin composition.

15. A shelf stable nonwoven fabric or film as defined by claim 1 wherein the transition metal organic salt is present in an amount which will provide a metal content of from about 50 ppm to about 1000 ppm by weight, based on the weight of the polyolefin composition.

16. A shelf stable nonwoven fabric or film as defined by claim 1 wherein the oxidizable unsaturated compound is present in an amount of from about 0.5 to about 5.0 percent by weight, based on the weight of the polyolefin composition.

17. A shelf stable polyolefin nonwoven fabric comprising a mixture of:
   A. a polyolefin which contains no more than a minor amount of phenolic antioxidant;
   B. a water sensitive compound which imparts high stability to the polyolefin composition under dry conditions of storage, shipping and consumer use but which, upon exposure to conditions of high humidity, interacts with water to form a material providing less stability to the polyolefin, allowing a transition metal organic salt to catalyze the degradation of the polyolefin;

C. a transition metal organic salt; and

D. an oxidizable unsaturated compound.

18. A shelf stable polyolefin nonwoven film comprising a mixture of:

A. a polyolefin which contains no more than a minor amount of phenolic antioxidant;

B. a water sensitive compound which imparts high stability to the polyolefin composition under dry conditions of storage, shipping and consumer use but which, upon exposure to conditions of high humidity, interacts with water to form a material providing less stability to the polyolefin, allowing a transition metal organic salt to catalyze the degradation of the polyolefin; and C. a transition metal organic salt; and D. an oxidizable unsaturated compound.

19. A composition for manufacturing a degradable article, wherein the composition comprises a mixture of:

A. a polyolefin which contains no more than a minor amount of phenolic antioxidant;

B. a water sensitive compound which imparts high stability to the polyolefin composition under dry conditions of storage, shipping and consumer use but which, upon exposure to conditions of high humidity, interacts with water to form a material providing less stability to the polyolefin, allowing a transition metal organic salt to catalyze the degradation of the polyolefin; and C. a transition metal organic salt; and D. an oxidizable unsaturated compound.

* * * * *

UNITED STATES PATENT AND TRADEMARK OFFICE
CERTIFICATE OF CORRECTION

PATENT NO. : 5,393,831
DATED : 02/28/95
INVENTOR(S) : Robert L. Hudson

It is certified that error appears in the above-identified patent and that said Letters Patent is hereby corrected as shown below:

Column 8, table 2 and 3 headings/ next to last column, "Lie" should read --Life --;

Column 10, table 2 and 3 headings/ next to last column, "Lie" should read --Life--;

Cover page, other publications, "Bone" should read --Boone--.

Signed and Sealed this

Twelfth Day of September, 1995

Attest:

BRUCE LEHMAN

Attesting Officer

Commissioner of Patents and Trademarks